(12) United States Patent
Jiang (10) Patent No.: US 10,048,834 B2
(45) Date of Patent: Aug. 14, 2018

(54) INFORMATION PROCESSING METHOD AND ELECTRONIC DEVICE

(71) Applicant: LENOVO (BEIJING) CO., LTD., Beijing (CN)

(72) Inventor: Xingping Jiang, Beijing (CN)

( * ) Notice: Subject to any disclaimer, the term of this patent is extended or adjusted under 35 U.S.C. 154(b) by 182 days.

(21) Appl. No.: 14/460,159

(22) Filed: Aug. 14, 2014

(65) Prior Publication Data

US 2015/0185976 A1    Jul. 2, 2015

(30) Foreign Application Priority Data

Dec. 27, 2013  (CN) .......................... 2013 1 0742987

(51) Int. Cl.
*G06F 3/048* (2013.01)
*G06F 3/0482* (2013.01)
*G06F 3/0481* (2013.01)
*G06F 3/0484* (2013.01)
*G06F 3/0487* (2013.01)

(52) U.S. Cl.
CPC .......... *G06F 3/0482* (2013.01); *G06F 3/0487* (2013.01); *G06F 3/04817* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 2006/0095865 | A1* | 5/2006 | Rostom | G06F 3/0482 715/810 |
| 2008/0198138 | A1* | 8/2008 | McFarlane | G06F 3/0421 345/173 |
| 2010/0017489 | A1* | 1/2010 | Birnbaum | G06F 1/1613 709/206 |
| 2010/0257473 | A1* | 10/2010 | Kang | G06F 3/1454 715/769 |

(Continued)

FOREIGN PATENT DOCUMENTS

| | | |
|---|---|---|
| CN | 102033706 | 4/2011 |
| CN | 102778997 | 11/2012 |
| WO | 2010145057 | 12/2010 |

OTHER PUBLICATIONS

Miran Mosmondor et al., 3D Visualization on mobile devices, 2006, Springer Science & Business Media, Edition or vol. 32, pp. 181-191 (Year: 2006).*

(Continued)

*Primary Examiner* — Tam T Tran
(74) *Attorney, Agent, or Firm* — Dentons US LLP; Peter Su (57) ABSTRACT

The invention discloses an information processing method and an electronic device. The information processing method is applied to an electronic device that includes a display unit, the method comprising when a second electronic device is connected with the electronic device and placed on the display unit, obtaining a placement position of the second electronic device on the display unit; determining a display position of a menu of the second electronic device (Continued)

based on position information of the placement position of the second electronic device; and displaying the menu on the determined display position; wherein the menu is a navigation menu of files stored on the second electronic device.

12 Claims, 5 Drawing Sheets

(56) References Cited

U.S. PATENT DOCUMENTS

| | | | |
|---|---|---|---|
| 2012/0032979 A1* | 2/2012 | Blow | G06F 1/1626 345/647 |
| 2013/0040567 A1* | 2/2013 | Matsubara | G06F 3/0488 455/41.1 |
| 2013/0093713 A1 | 4/2013 | Bose et al. | |
| 2013/0268897 A1 | 10/2013 | Li et al. | |

OTHER PUBLICATIONS

Antti Aaltonen et al., Context Awareness Perspectives for Mobile Personal Media, Fall 2005, Information Systems Management, Edition or vol. 22, 4; pp. 43-55 (Year: 2005).*

Chinese Patent Application CN 201310742987.X, Chinese Patent Office, First Office Action dated Feb. 4, 2016; 8 pages.

English Text of First Office Action for Chinese Patent Application CN 201310742987.X, Chinese Patent Office, First Office Action dated Feb. 4, 2016; 9 pages.

English Translation of WO Patent No. WO2010145057, Published on Dec. 23, 2010, TCL (Shenzhen TCL New Technology Co., Ltd); 10 pages.

English Translation of Chinese Patent No. 102033706, published on Apr. 27, 2011, CN VTRON Technologies Ltd; 12 pages.

English Translation of Chinese Patent No. 102778997, published on Nov. 14, 2012, Lenovo Beijing Ltd; 12 pages.

Chinese Patent Application CN 201310742987.X, Chinese Patent Office, Second Office Action dated Oct. 9, 2016; 7 pages.

English Text of Second Office Action for Chinese Patent Application CN 201310742987.X, Chinese Patent Office, Second Office Action dated Oct. 9, 2016; 9 pages.

German Patent Application No. 102014112642.4, German Patent Office, First Office Action dated Dec. 6, 2016; 6 pages.

English Text of First Office Action for German Patent Application No. 102014112642.4, German Patent Office, First Office Action dated Dec. 6, 2016; 2 pages.

* cited by examiner

INFORMATION PROCESSING METHOD AND ELECTRONIC DEVICE

CROSS REFERENCE TO RELATED APPLICATIONS

This application claims the benefit under 35 U.S.C. § 119(a) of Chinese Patent Application No. 201310742987.X, filed on Dec. 27, 2013, the disclosure of which is incorporated by reference herein in its entirety.

FIELD OF THE INVENTION

The present disclosure relates to the technical field of electronic technology, and, more particularly, to an information processing method and an electronic device.

BACKGROUND OF THE INVENTION

With the development of electronic technology, a wide range of electronic products has emerged, especially consumer electronic devices, such as tablet PCs, large-size tablet PCs, smart phones, laptops, and so on.

To facilitate the use of electronic devices, such devices are always provided with a display unit, on which an operate-control region is displayed on the display unit, such as a desktop. A user can use the electronic device through an operation object on the operate-control region, for example the user creates a plurality of shortcuts on the desktop and clicks on the shortcuts to open a music player, browse pictures and so on. Further, the electronic device is usually connected with another electronic device. After connection, a navigation menu of the other electronic device will be displayed on the display unit and files on the other electronic device can be viewed or operated by clicking on the navigation menu.

In the prior art, the navigation menu of the other electronic device is usually displayed at a fixed display position on the display unit of the electronic device, e.g. the upper right corner of the display unit; or, when the electronic device is connected with a plurality of other electronic devices, navigation menus of the plurality of other electronic devices are all displayed at a fixed position, and differentiating the respective other electronic devices relies entirely on names of the navigation menus.

However, if the navigation menu is displayed at a fixed position, it will be quite inconvenient for the user to use a large-size electronic device. For example, if the user connects his/her own mobile phone with the large-size electronic device in the lower left corner, but the navigation menu appears in the upper right corner, then the user will need to move to a position in the upper right corner to operate. Further, the large-size electronic device is usually in a multi-user use environment, so when multiple users connect their mobile phones to the large-size electronic device, it is difficult to distinguish the multiple navigation menus. This is apt to cause misoperation, such as a user A operating mistakenly on files on the mobile phone of a user B. Accordingly, in the prior art, there is a technical problem that the position of the navigation menu is fixed inherently by the electronic device, which causes inconvenience to user operation.

SUMMARY OF THE INVENTION

Embodiments of the present disclosure provide an information processing method and an electronic device, for solving the technical problem that the position of the navigation menu is fixed inherently by the electronic device, which causes inconvenience to user operation existing in the prior art.

An aspect of the present disclosure provides an information processing method applied to an electronic device that includes a display unit, the method comprising when a second electronic device is connected with the electronic device and placed on the display unit, obtaining a placement position of the second electronic device on the display unit; determining a display position of a menu of the second electronic device based on position information of the placement position of the second electronic device; and displaying the menu on the determined display position; wherein the menu is a navigation menu of files stored on the second electronic device.

Optionally, the display position is located within a predetermined range of the placement position.

Optionally, a boundary of the display position is adjacent to a boundary of the placement position.

Optionally, when a second electronic device is connected with the electronic device, prior to the second electronic device being placed on the display unit, the method further comprises displaying the menu at a preset position.

Optionally, the method further comprises when the menu is displayed at the preset position and the second electronic device is being wobbled, obtaining a wobbling parameter of the second electronic device; and wobbling-displaying the menu with the wobbling parameter at the preset position.

Optionally, the method further comprises when the menu is displayed at the display position and the second electronic device is being wobbled, obtaining a wobbling parameter of the second electronic device; and wobbling-displaying the menu with the wobbling parameter at the display position.

Optionally, the method further comprises while wobbling-displaying the menu, controlling tiles on the second electronic device to be displayed on the display unit with a parameter consistent with the wobbling parameter of the menu.

Optionally, a display position of the files is located within a predetermined range of the display position of the menu.

Optionally, displaying the menu on the determined display position comprises displaying two concentric polygons having different radiuses at the display position, forming an annular polygon between the two concentric polygons having different radiuses; and displaying M menu items on the annular polygon, thus forming the menu.

Another aspect of the present disclosure provides an electronic device, comprising a display unit; a connection unit for connecting with a second electronic device; a position obtaining unit for, when a second electronic device is connected with the electronic device and placed on the display unit, obtaining a placement position of the second electronic device on the display unit; and a processing unit for determining a display position of a menu of the second electronic device based on position information of the placement position of the second electronic device, controlling to display the menu on the determined display position; wherein the menu is a navigation menu of files stored on the second electronic device.

Optionally, the display position is located within a predetermined range of the placement position.

Optionally, a boundary of the display position is adjacent to a boundary of the placement position.

Optionally, the processing unit is further for, when a second electronic device is connected with the electronic device, prior to the second electronic device being placed on the display unit, controlling to display the menu at a preset position.

Optionally, the processing unit is further for, when the menu is displayed at the preset position and the second electronic device is being wobbled, obtaining a wobbling parameter of the second electronic device, controlling to wobbling-display the menu with the wobbling parameter at the preset position.

Optionally, the processing unit is further for, when the menu is displayed at the display position and the second electronic device is being wobbled, obtaining a wobbling parameter of the second electronic device, controlling to wobbling-display the menu with the wobbling parameter at the display position.

Optionally, the processing unit is further for controlling files on the second electronic device to be displayed on the display unit with a parameter consistent with the wobbling parameter of the menu while controlling to wobbling-display the menu.

Optionally, a display position of the files is located within a predetermined range of the display position of the menu.

Optionally, the processing unit is specifically for displaying two concentric polygons having different radiuses at the display position, forming an annular polygon between the two concentric polygons having different radiuses; and displaying M menu items on the annular polygon, thus forming the menu.

In an embodiment of the present disclosure, when a second electronic device is connected with the electronic device and placed on the display unit, a placement position of the second electronic device on the display unit is obtained; a display position of a menu of the second electronic device is determined based on position information of the placement position of the second electronic device; and the menu is controlled to be displayed on the determined display position; wherein the menu is a navigation menu of files stored on the second electronic device. It can be seen that, in this embodiment, the display position of the menu is associated with the placement position of the second electronic device, rather than being a default display position. The display position of the menu therefore is more flexible, and convenient for the user to operate; further, it is also possible to change the display position of the menu by changing the placement position of the second electronic device, so that a multi-azimuth requirement of the user can be met, which is more user-friendly; further, the display position of each second electronic device is associated with the (placement) position of each second electronic device, which facilitates the user identifying the menu of his/her own electronic device, reduces misoperations, and facilitates user operation.

Further, the display position is located within a predetermined range of the placement position, for example a boundary of the display position is adjacent to a boundary of the placement position. It is possible to further clarify a pertaining relationship between the menu and the second electronic device, and it is more convenient for the user to operate the menu with a more expedient gesture, without making movement.

Still further, regardless of whether the position of the menu is associated with the placement position of the second electronic device, in this embodiment, when the second electronic device is being wobbled, the menu will be wobbled with the same wobbling parameter at the original position, to achieve synchronization with the electronic device, thereby facilitating the user quickly and accurately finding the menu belonging to his/her own electronic device among multiple menus.

Still further, in this embodiment, when the menu is being wobbled along with the second electronic device, the files on the second electronic device are controlled to be displayed on the display unit with a parameter consistent with the wobbling parameter of the menu. A natural way to display files is therefore provided in this embodiment. Gestures and reactions thereof in the interface are made to be linked tightly, and the interactive interface is more user-friendly.

DETAILED DESCRIPTION OF THE PREFERRED EMBODIMENTS

Embodiments of the present disclosure provide an information processing method and an electronic device, for solving the technical problem that the position of the navigation menu is fixed inherently by the electronic device, which causes inconvenience to user operation existing in the prior art.

In an embodiment of the present disclosure, when a second electronic device is connected with the electronic device and placed on the display unit, a placement position of the second electronic device on the display unit is obtained; a display position of a menu of the second electronic device is determined based on position information of the placement position of the second electronic device; and the menu is controlled to be displayed on the determined display position; wherein the menu is a navigation menu of tiles stored on the second electronic device. It can be seen that, in this embodiment, the display position of the menu is associated with the placement position of the second electronic device, rather than being a default display position. The display position of the menu therefore is more flexible, and convenient for the user to operate; further, it is also possible to change the display position of the menu by changing the placement position of the second electronic device, so that a multi-azimuth requirement of the user can be met, which is more user-friendly; further, the display position of each second electronic device is associated with the (placement) position of each second electronic device, which facilitates the user identifying the menu of his/her own electronic device, reduces misoperations, and facilitate user operation.

To enable better understanding of the aforesaid technical solutions, hereinafter the technical solutions will be described in detail with reference to the accompanying drawings and the specific implementation modes.

An embodiment of the present disclosure provides an information processing method applied to an electronic device, which for example is a conventional tablet PC, a large-size tablet PC, or other electronic device that supports multi-user multi-azimuth operation. The electronic device includes a display unit.

A second electronic device may be connected with the electronic device, the second electronic device for example being a mobile phone, a tablet PC, or a data storage device connected with the electronic device by being placed on the display unit. Specifically, the second electronic device may be connected with the electronic device via a data line, Bluetooth, or through an RF tag.

Figure 1:
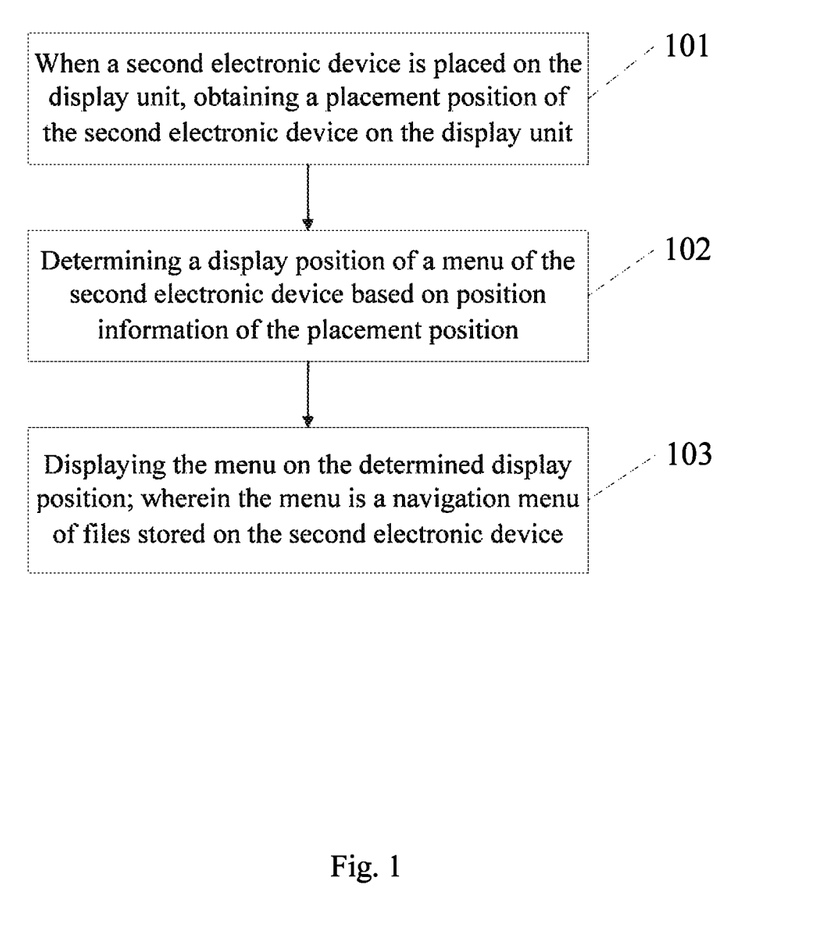
FIG. 1 is a flowchart of an information processing method according to an embodiment of the present disclosure.

When the second electronic device is connected with the electronic device, referring to FIG. 1, FIG. 1 is a flowchart of an information processing method according to an embodiment of the present disclosure. The method comprises:

Step 101: when a second electronic device is connected with the electronic device and placed on the display unit, obtaining a placement position of the second electronic device on the display unit;

Step 102: determining a display position of a menu of the second electronic device based on position information of the placement position of the second electronic device;

Step 103: displaying the menu on the determined display position; wherein the menu is a navigation menu of files stored on the second electronic device.

In step 101, when the second electronic device is placed on the display unit, the placement position of the second electronic device may be obtained specifically by a touch control unit, or by a pressure sensor, or by a camera set in a corner of the display unit. Of course, the placement position of the second electronic device may also be obtained in other manners; the present application makes no limitation thereto.

Further, in step 101, the time at which the user places the second electronic device on the display unit may be prior to connecting the second electronic device with the electronic device, for example the user first places the mobile phone on the display unit and thereafter connects it with the electronic device.

In another embodiment, the time at which the user places the second electronic device on the display unit may also be after connecting the second electronic device with the electronic device. Then, prior to the second electronic device being placed on the display unit, the method further comprises displaying the menu at a preset position. The preset position for example is a default position of the electronic device, e.g. an upper right corner of the display unit, or is displayed on the display unit at random. For example the user first takes the mobile phone in hand, and then connects it with the electronic device via Bluetooth. In this case, the electronic device controls to display the navigation menu of the mobile pone at a preset position. Thereafter, the user places the mobile phone on the display unit, then at this time step 101 is carried out to obtain the placement position of the mobile phone on the display unit.

In another embodiment, the time at which the user places the second electronic device on the display unit may also be that, in the case that the second electronic device is connected with the electronic device, the second electronic device is placed on the display unit at a former time, thereafter the second electronic device is taken away, and again it is placed on the display unit. For example, in the case that the mobile phone and the electronic device are already connected, the user takes away the mobile phone placed on the display unit, and thereafter places it on the display unit again. Therefore, in this embodiment, prior to the user takes away the mobile phone placed on the display unit thereafter places it on the display unit again, the display position of the menu may be the position determined when it is placed at a former time, and may also be a preset position in the former embodiment.

Regardless of the time at which the second electronic device is placed on the display unit, when it is placed on the display unit, the placement position of the second electronic device on the display unit will be obtained in the manners described above. Step 102 is carried out after the placement position is obtained, i.e. determining a display position of a menu of the second electronic device based on position information of the placement position of the second electronic device.

In practice, step 102 specifically is determining a display position of a menu based on position information of the placement position within a predetermined range of the placement position, wherein the predetermined range may be set by the user, or the electronic device may provide a default value. Generally, the predetermined range can allow the menu to be operated conveniently when the display position is located within the predetermined range provided that the user's position when he/she is placing the second electronic device remains unchanged; in other words, the display position is located on the periphery of the placement position.

Figure 2:
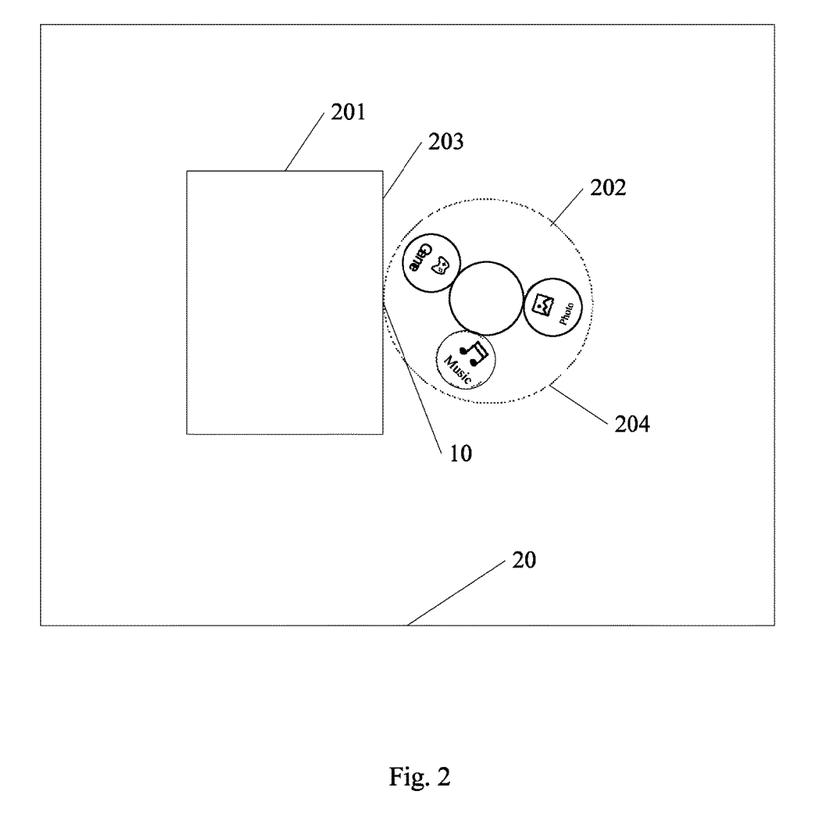
FIG. 2 is a schematic diagram of a positional relationship between a display position and a placement position in an embodiment of the present disclosure.

In a specific implementation process, there are a variety of implementation modes, for example the predetermined range is a range that makes a boundary of the display position be adjacent to a boundary of the placement position, as shown in FIG. 2, 201 indicates the placement position of the second electronic device on the display unit 20, the placement position 201 has a boundary 203, a boundary 204 of the menu 202 is the boundary 204 that indicates the display position of menu 202, the boundary 203 and the boundary 204 are adjacent at a crossing point 10. When the electronic device determines the display position based on position information of the placement position, it is possible to first determine a central point of the placement position, and thereafter a rule for determining is that a link between the central point of the placement position and the central point of the display position is parallel to an edge of the display unit, so that horizontal or vertical coordinates of the central point of the display position can be determined. Thereafter, it is possible to determine the vertical and horizontal coordinates of the central point according to a distance value of the boundary of the display position away from the central point. This distance value should be less than or equal to a minimum distance of the central point away from the placement point. Thereafter the display position can be determined based on the distance value. The display position determined by said rule may be located at the left, right, upper, or lower side of the placement position; FIG. 2 shows the display at the right side of the placement position as an example.

Accordingly, the method in this embodiment can further clarify a pertaining relationship between the menu and the second electronic device, and it is more convenient for the user to operate the menu with a more expedient gesture without making movement.

Of course, the display position may be determined by other rules, such as calculating that the placement position is closest to which boundary of the display unit, for example, the boundary to which the shortest distance of the central point of the placement position away from each boundary of the display unit corresponds, then the display position is determined as within a range close to the boundary.

When the display position of the menu is determined by any of the above described manners, the menu is displayed at the determined display position, i.e. step 103 is carried out.

The menu in this embodiment is a navigation menu of files stored on the second electronic device. For example, as shown in FIG. 2, the second electronic device stores music, photos, games, and other files; it is possible to enter a different folder by clicking on each menu item, and thereby operate the files.

As can be seen from the above description, in this embodiment, the display position of the menu is associated with the placement position of the second electronic device, rather than being a default display position. The display position of the menu therefore is more flexible, and convenient for the user to operate; further, it is also possible to change the display position of the menu by changing the placement position of the second electronic device, so that a multi-azimuth requirement of the user can be met, which is more user-friendly; further, the display position of each second electronic device is associated with the (placement) position of each second electronic device, which facilitates the user identifying the menu of his/her own electronic device, reduces misoperations, and facilitates user operation.

In an embodiment, step 103 specifically comprises displaying two concentric polygons having different radiuses at the display position, forming an annular polygon between the two concentric polygons having different radiuses; and displaying M menu items on the annular polygon, thus forming the menu. Referring still to FIG. 2, menu 202 is two concentric circles having different radiuses; three menu items of Music, Photo, and Game are displayed on the formed ring. In practice, the polygon may also be elliptical, rectangular, pentagonal, parallelogramical, hexagonal, etc.

Figure 3:
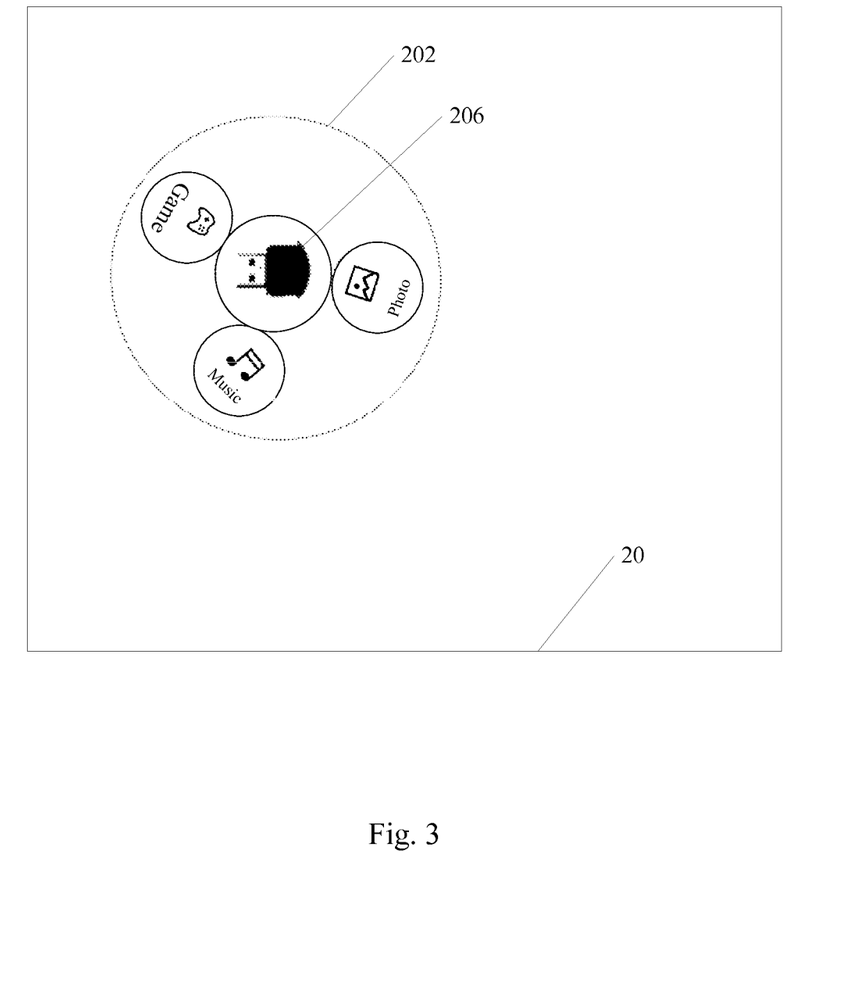
FIG. 3 is a schematic diagram of a menu in an embodiment of the present disclosure.

Further, identification information of the second electronic device and/or connection manner of the second electronic device with the electronic device may also be displayed at the central position of the menu, e.g. the polygon with a smaller radius. The identification information for example is type (e.g. mobile phone or tablet PC) or model (e.g., model of the mobile phone of the second electronic device, and the connection manner for example is USB connection, WiFi or Bluetooth, all of which can be displayed at the central position of the menu. As shown in FIG. 3, the central position 206 displays that the second electronic device is connected with the electronic device via USB.

Next, an operation mode to naturally display files will be described. When the menu is displayed on the display unit, the user may take the mobile phone in hand to wobble, or keep the mobile phone at the placement (position) and wobble it, such as wobbling from side to side or up and down. In either case, when the second electronic device is being wobbled, the electronic device can obtain the wobbling parameter of the second electronic device, e.g., wobbling frequency and/or amplitude. There may be multiple ways when implementing the specific obtaining mode in practice, for example, when the second electronic device is being wobbled in the case of department or non-department, the second electronic device can detect its own wobbling frequency and/or amplitude by means of an internal or external sensor. Since the second electronic device and the electronic device are already in a connected state, the second electronic device can transmit the wobbling parameter to the electronic device through the connection path. When the second electronic device is being wobbled at the placement position, the electronic device can for example make a calculation based on the fact that light is blocked, to obtain the wobbling parameter of the second electronic device.

When the electronic device obtains the wobbling parameter, it wobbling-displays the menu at the display position of the menu with the wobbling parameter. For example, in the case that the menu is already displayed at the preset position when the second electronic device is being wobbled, then the menu is wobbling-displayed at the preset position. That is, the menu is wobbled synchronously. In this way, the user can quickly find the menu corresponding to the second electronic device from among a plurality of menus, which avoids the inconvenience of looking one by one. Of course, in practice, the wobbling parameter of the menu and the wobbling parameter of the second electronic device may not be identical.

In a further embodiment, while wobbling-displaying the menu, the method further comprises controlling files on the second electronic device to be displayed on the display unit with a parameter consistent with the wobbling parameter of the menu. Thereby, the technical effect that the files come out because the menu is wobbled to "shake" them out is achieved, and further it feels like wobbling the mobile phone to shake the files out, thus implementing a natural operation effect.

Figure 4:
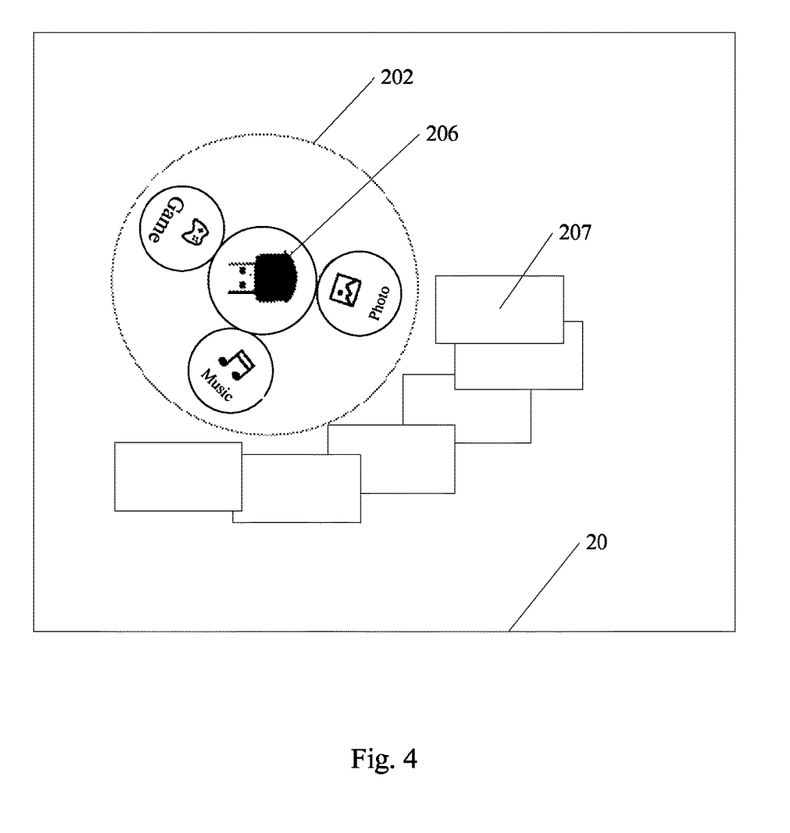
FIG. 4 is a schematic diagram of displaying files in an embodiment of the present disclosure.

Referring to FIG. 4, when the menu 202 is being wobbled, the files 207 are displayed on the display unit 20, and it feels as if the files 207 are "shaken out".

In practice, there are different implementation modes to determine which files are to be displayed, for example random display or display by certain rules, like file type. As an example, a picture is displayed first and music is displayed next; as another example, display is based on file size; or it is set by self-defining by the user.

Further, the display frequency of the files is consistent with the wobbling frequency of the menu, so, the faster the menu is being wobbled, the more rapidly the files will be displayed.

Alternatively, the display position of the files is located within a predetermined range of the display position of the menu.

Further, when displaying the files, those that are displayed first are closer to the menu, while those that are displayed later are correspondingly further away from the menu. Or, alternatively, the display distance can be determined based on the wobbling frequency of the menu, for example, the smaller the frequency is, the closer the files are to menu, the faster the frequency is, the farther the files are away from the menu.

By this embodiment, a natural way to display files therefore is provided in this embodiment. Gestures and their reactions in the interface are made to be linked tightly, and the interactive interface is more user-friendly.

Figure 5:
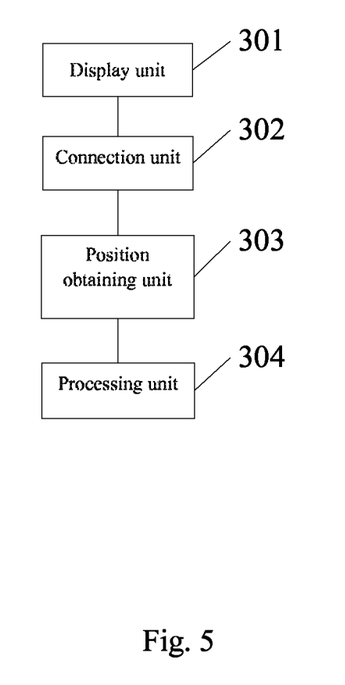
FIG. 5 is a functional block diagram of an electronic device in an embodiment of the present disclosure.

Based on the same inventive concept, an embodiment of the present disclosure further provides an electronic device, which for example is a tablet PC, a smart phone, or a large-size tablet PC. Referring to FIG. 5, the electronic device comprises a display unit 301; a connection unit 302 for connecting with a second electronic device; a position obtaining unit 303 for, when a second electronic device is connected with the electronic device and placed on the display unit 301, obtaining a placement position of the second electronic device on the display unit 301; and a processing unit 304 for determining a display position of a menu of the second electronic device based on position information of the placement position of the second electronic device, controlling to display the menu on the determined display position; wherein the menu is a navigation menu of files stored on the second electronic device.

The connection unit 302 specifically is a USB connection module, a WiFi connection module, a Bluetooth connection module etc.

The position obtaining unit 303 specifically is a touch control unit, such as a capacitive touch control unit or an optical touch control unit, and may also be a pressure sensor, or a camera unit or other elements that are able to detect the placement position of the second electronic device.

The processing unit 304 specifically is a processing chip disposed on a circuit board and connected with the position obtaining unit 303, the connection unit 302, and the display unit 301.

In an embodiment, the display position is located within a predetermined range of the placement position.

Further, a boundary of the display position is adjacent to a boundary of the placement position.

In an embodiment, the processing unit 304 is further for, when a second electronic device is connected with the electronic device, prior to the second electronic device being placed on the display unit 301, controlling to display the menu at a preset position.

Further, the processing unit 304 is further for, when the menu is displayed at the preset position and the second electronic device is being wobbled, obtaining a wobbling parameter of the second electronic device, controlling to wobbling-display the menu with the wobbling parameter at the preset position.

In an embodiment, the processing unit 304 is further for, when the menu is displayed at the display position and the second electronic device is being wobbled, obtaining a wobbling parameter of the second electronic device, controlling to wobbling-display the menu with the wobbling parameter at the display position.

Further, the processing unit 304 is further for controlling files on the second electronic device to be displayed on the display unit 301 with a parameter consistent with the wobbling parameter of the menu while controlling to wobbling-display the menu.

Further, a display position of the files is located within a predetermined range of the display position of the menu.

In conjunction with the above embodiments, the processing unit 304 is specifically for displaying two concentric polygons having different radiuses at the display position, forming an annular polygon between the two concentric polygons having different radiuses; and displaying M menu items on the annular polygon, thus forming the menu.

The electronic device in this embodiment and the information processing method in the foregoing embodiment are the inventions based on the same concept. Those skilled in the art can clearly understand the implementation process of the electronic device in this embodiment through the foregoing detailed descriptions on the information processing method and various variations thereof. No more details are repeated for brevity of the specification.

One or more of the technical solutions provided in the embodiments of the present disclosure have at least the following technical effects or advantages:

In an embodiment of the present disclosure, when a second electronic device is connected with the electronic device and placed on the display unit, a placement position of the second electronic device on the display unit is obtained; a display position of a menu of the second electronic device is determined based on position information of the placement position of the second electronic device; the menu is controlled to be displayed on the determined display position; wherein the menu is a navigation menu of files stored on the second electronic device. It can be seen that, in this embodiment, the display position of the menu is associated with the placement position of the second electronic device, rather than being a default display position. The display position of the menu therefore is more flexible, and convenient for the user to operate; further, it is also possible to change the display position of the menu by changing the placement position of the second electronic device, so that a multi-azimuth requirement of the user can be met, which is more user-friendly; further, the display position of each second electronic device is associated with the (placement) position of each second electronic device, which facilitates the user identifying the menu of his/her own electronic device, reduces misoperations, and facilitates user operation.

Further, the display position is located within a predetermined range of the placement position, for example a boundary of the display position is adjacent to a boundary of the placement position. It is possible to further clarify a pertaining relationship between the menu and the second electronic device, and it is more convenient for the user to operate the menu with a more expedient gesture without making movement.

Still further, regardless of whether the position of the menu is associated with the placement position of the second electronic device, in this embodiment, when the second electronic device is being wobbled, the menu will be wobbled with the same wobbling parameter at the original position, to achieve synchronization with the electronic device, thereby facilitating the user quickly and accurately finding the menu belonging to his/her own electronic device among multiple menus.

Still further, in this embodiment, when the menu is being wobbled along with the second electronic device, the files on the second electronic device are controlled to be displayed on the display unit with a parameter consistent with the wobbling parameter of the menu. A natural way to display files therefore is provided in this embodiment. Gestures and their reactions in the interface are made to be linked tightly, the interactive interface is more user-friendly.

Specifically, computer program instructions to which the information processing method in the embodiment of the present disclosure corresponds may be stored in an optical disk, a hard disk, a U disk, and other storage media. When the computer program instructions corresponding to the information processing method in the storage medium are read or executed by an electronic device, the following steps are comprised when a second electronic device is connected with the electronic device and placed on the display unit, obtaining a placement position of the second electronic device on the display unit; determining a display position of a menu of the second electronic device based on position information of the placement position of the second electronic device; and displaying the menu on the determined display position; wherein the menu is a navigation menu of files stored on the second electronic device.

Optionally, the display position is located within a predetermined range of the placement position.

Optionally, a boundary of the display position is adjacent to a boundary of the placement position.

Optionally, when a second electronic device is connected with the electronic device, prior to the second electronic device being placed on the display unit, the method further comprises displaying the menu at a preset position.

Optionally, the method further comprises when the menu is displayed at the preset position and the second electronic device is being wobbled, obtaining a wobbling parameter of the second electronic device; and wobbling-displaying the menu with the wobbling parameter at the preset position.

Optionally, the method further comprises when the menu is displayed at the display position and the second electronic device is being wobbled, obtaining a wobbling parameter of the second electronic device; and wobbling-displaying the menu with the wobbling parameter at the display position.

Optionally, while wobbling-displaying the menu, the method further comprises controlling files on the second electronic device to be displayed on the display unit with a parameter consistent with the wobbling parameter of the menu.

Optionally, a display position of the files is located within a predetermined range of the display position of the menu.

Optionally, displaying the menu on the determined display position comprises displaying two concentric polygons having different radiuses at the display position, forming an annular polygon between the two concentric polygons having different radiuses; and displaying M menu items on the annular polygon, thus forming the menu.

Obviously, those skilled in the art can make various modifications and variations to the present disclosure without departing from the spirit and scope of the present disclosure. Thus, if these modifications and variations of the present disclosure fall into the scope of the claims of the invention or equivalents thereof, the present disclosure is also intended to include these modifications and variations.

What is claimed is:

1. An information processing method applied to an electronic device that includes a display unit, the method comprising:
   when a second electronic device is connected with the electronic device and placed on the display unit, obtaining a placement position of the second electronic device on the display unit;
   determining a display position of a menu of the second electronic device based on position information of the placement position; and
   displaying the menu on the determined display position;
   wherein the menu is a navigation menu of files stored on the second electronic device,
   wherein the method further comprises:
   when the menu is displayed at the display position and the second electronic device is being wobbled, obtaining a wobbling parameter of the second electronic device;
   wobbling-displaying the menu with the wobbling parameter at the display position; and
   while wobbling-displaying the menu, controlling files on the second electronic device to be displayed on the display unit with a parameter consistent with the wobbling parameter of the menu;
   wherein, when the second electronic device is connected with the electronic device, prior to the second electronic device is placed on the display unit, the method comprises displaying the menu at a preset position.

2. The method of claim 1, wherein the display position is located within a predetermined range of the placement position.

3. The method of in claim 2, wherein a boundary of the display position is adjacent to a boundary of the placement position.

4. The method of claim 1, wherein the method further comprises:
   when the menu is displayed at the preset position and the second electronic device is being wobbled, obtaining a wobbling parameter of the second electronic device; and
   wobbling-displaying the menu with the wobbling parameter at the preset position.

5. The method of claim 1, wherein a display position of the files is located within a predetermined range of the display position of the menu.

6. The method of claim 1, wherein displaying the menu on the determined display position comprises:
   displaying two concentric polygons having different radiuses at the display position, forming an annular polygon between the two concentric polygons having different radiuses; and
   displaying M menu items on the annular polygon, thus forming the menu.

7. An electronic device, comprising:
   a display unit;
   a connector for connecting with a second electronic device;
   a position sensor for, when a second electronic device is connected with the electronic device and placed on the display unit, obtaining a placement position of the second electronic device on the display unit; and
   a processing unit for determining a display position of a menu of the second electronic device based on position information of the placement position of the second electronic device, controlling to display the menu on the determined display position;
   wherein the menu is a navigation menu of files stored on the second electronic device,
   wherein the processing unit is further for, when the menu is displayed at the display position and the second electronic device is being wobbled, obtaining a wobbling parameter of the second electronic device, controlling to wobbling-display the menu with the wobbling parameter at the display position, and
   wherein the processing unit is further for controlling files on the second electronic device to be displayed on the display unit with a parameter consistent with the wobbling parameter of the menu while controlling to wobbling-display the menu;
   wherein the processing unit is for, when a second electronic device is connected with the electronic device, prior to the second electronic device is placed on the display unit, controlling to display the menu at a preset position.

8. The electronic device of claim 7, wherein the display position is located within a predetermined range of the placement position.

9. The electronic device of claim 8, wherein a boundary of the display position is adjacent to a boundary of the placement position.

10. The electronic device of claim 7, wherein the processing unit is further for, when the menu is displayed at the preset position and the second electronic device is being wobbled, obtaining a wobbling parameter of the second electronic device, controlling to wobbling-display the menu with the wobbling parameter at the preset position.

11. The electronic device of claim 10, wherein a display position of the files is located within a predetermined range of the display position of the menu.

12. The electronic device of claim 7, wherein the processing unit is specifically for displaying two concentric polygons having different radiuses at the display position, forming an annular polygon between the two concentric polygons having different radiuses; and displaying M menu items on the annular polygon, thus forming the menu.

\* \* \* \* \*